Patented Mar. 12, 1935

1,994,433

UNITED STATES PATENT OFFICE 1,994,433

PREPARATION OF FATTY ACIDS

Edgar T. Olson, New York, N. Y., and Arthur W. Goos, Marquette, Mich., assignors to The Cleveland Cliffs Iron Company, Cleveland, Ohio, a corporation of Ohio No Drawing. Application October 13, 1933, Serial No. 693,514

20 Claims. (Cl. 260—116)

This invention relates to the production and manufacture of fatty acids, and more particularly to a commercially feasible method of producing the lower fatty acids and their salts such as propionic acid and its salts.

Prior to the present invention, fatty acids have been produced, for example, by a process in which distillery waste, as obtained in the production of ethyl alcohol from grains, is treated by bacteria. The bacteria may be obtained from ensilage, or decayed fruit or other sources. In this process the distillery waste was subjected to the fermentation of the bacteria until the fatty acids were first produced whereupon the various components were separated and refined.

By another process, hydrocarbons of various kinds, particularly oils and petroleum products, were converted to alcohols or alcohols were produced from other sources. The proper alcohol was then selected and oxidized in the presence of a catalyst, to produce the desired fatty acid. More specifically, olefine material from cracked gasoline may be dissolved in sulphuric acid and treated with water to form alcohol. Thereafter the alcohol was vaporized with steam and mixed with air and passed over catalytic materal, such as copper, whereupon it was oxydized to a fatty acid.

By the foregoing and other processes of producing fatty acids, difficulties and undesirable features of expense, time, labor, equipment and low yields have arisen which are largely avoided or overcome by the process disclosed herein. The present invention contemplates broadly treating the higher alcoholates, or more specifically the ethylates, with carbon monoxide in the presence of an ether, such as ethyl-oxide, to form the lower fatty acids or their salts.

While the principles of the present invention can be employed to produce substantially any fatty acid or its salt, they are particularly applicable to the manufacture of propionic acid and its salts and accordingly this reaction will be taken as typical and will be completly described. According to this invention an alcoholate or ethylate such as, for example, sodium ethylate, is subjected to the action of carbon monoxide under pressure to produce sodium propionate. The chemical reaction involved is as follows:

$$C_2H_5ONa + CO \rightarrow C_2H_5COONa$$

A particular feature of the invention is the inclusion in the reaction of an ether, such as ethyl-oxide $(C_2H_5)_2O$. With this material present the reaction comes substantially to theoretical completion in many instances if the proper conditions of temperature and pressure are maintained. The ether does not enter into the reaction as far as can be determined but appears to act largely as a catalyst.

The ether may be diluted with an inert solvent such as petroleum spirits, octane, heptane, benzol, toluol or zylol, or other similar hydrocarbons which do not react with ethylates or alcoholates.

The fatty acid, of course, is produced from its salt by any well known process, for example, by the reaction with sulphuric acid which is as follows when sodium-propionate is the material produced as above:

$$2C_2H_5COONa + H_2SO_4 \rightleftharpoons 2C_2H_5COOH + Na_2SO_4$$

The reaction is impaired if more than traces of alcohol are present. This is believed due to the tendency of the alcohol to react with the ethylate or alcoholate to produce a formate. This reaction is better illustrated by a typical example such as is thought to occur in the production of sodium-propionate. In this reaction the starting materials, sodium-ethylate, when reacted with carbon monoxide and in the presence of alcohol tends to form ethyl-formate and sodium-propionate. The ethyl-formate is saponified by the sodium-ethylate to form sodium-formate and more free alcohol. This reaction is believed to continue until all of the sodium-ethylate has been used up and the reaction products comprise largely sodium-formate and free alcohol, and only a small amount of sodium propionate.

It might be said that the yields of the fatty acid salt are inversely proportional to the amount of alcohol present. Therefore, in order to obtain high yields of the fatty acid salt every precaution should be taken normally to insure the absence of alcohol.

The original reaction, in the present invention, of the alcoholate or ethylate and carbon monoxide can be carried on in any suitable apparatus in which the materials can be intermixed while controlling the temperature and pressure. A suitable apparatus is illustrated, however, in U. S. Patent No. 1,935,914 issued November 21, 1933 and relating to the preparation of aromatic aldehydes. This apparatus briefly comprises an autoclave with a removable top portion which can be sealed in place and which is provided with a mechanical stirring means and with conduits which permit the circulation of carbon monoxide through the autoclave and maintenance of the desired pressure in the autoclave. The autoclave is provided with jackets or other means for controlling the temperature. This type of apparatus is ordinarily adapted only for laboratory production as will be understood.

When the operation is performed commercially the apparatus will preferably take the form of the continuous tank system also disclosed in said patent which system briefly comprises a series of tanks through which the reacting liquids can be forced, with the carbon monoxide being adapted to be passed in a counter direction to the flow of the liquids with or without mechanical agitating means.

It is likewise contemplated to employ a rotatable autoclave for commercial production which mechanism can be built in any desired size and which normally comprises a drum journalled on a horizontal axis for rotation and adapted to removably contain the reacting materials.

It has been determined that improved yields are obtained of the fatty acids and their salts if the reaction is carried on under certain conditions of temperature and pressure. For example, it has been found that the best results are produced if the temperature is maintained comparatively low, say in the neighborhood of 20 to 60 degrees centigrade, although the reaction will proceed at temperatures materially above and below the preferred ranges. The reaction proceeds best when the pressures are maintained rather high, say in the neighborhood of from 1000 to 2000 pounds per square inch, although likewise the reaction will proceed at pressures considerably above and below the preferred pressure.

By the term "alcoholates" employed in the claims and specification it is intended to include the higher alcohols in which the hydrogen of the hydroxal radical has been replaced by a metal, such as sodium, calcium, potassium, etc. Typical alcoholates include methylates, butylates, ethylates, propylates, pentylates, etc. Other more specific examples include sodium butyrate, sodium propylate, sodium methylate, normal sodium amylate, and sodium alcoholate of diethyl carbinal. By the term "ethylates" it is intended to mean these substances such as sodium, calcium and potassium ethylate, etc. in which the hydrogen of the hydroxal radical of ethyl-alcohol has been replaced by a metal. The term "ether" is intended to include all the simple ethers, preferably ethyl oxide but likewise amyl-ether, butyl-ether, methyl-ether, etc. It has likewise been found that certain of the complex ethers such as methyl-ethyl ether function in a like capacity and therefore these substances are intended to fall under the broad term "ether". Certain more specific compounds include ethyl ether, iso propyl butyl ether, methyl ethyl ether, normal propyl ether, and ethyl propyl ether. By the term "fatty acids" it is intended to include all those substances of this general class such as formic, acetic, propionic, valeric, butyric, caproic, stearic, palmitic, etc. While the process is best adapted to produce the lower fatty acids and their salts it is likewise intended to include the higher fatty acids in that these can likewise be reacted in varying degrees.

In accordance with the patent statutes certain examples of the present invention have been completely described, however, it will be understood that the scope of the invention is not limited thereto but is defined by the appended claims.

1. That method of preparing a lower fatty acid salt which comprises reacting an ethylate with carbon monoxide in the presence of an ether selected from the group consisting of simple and mixed aliphatic ethers.

2. That step in the production of a fatty acid which comprises reacting a higher alcoholate with carbon monoxide in the presence of an ether selected from the group consisting of simple and mixed aliphatic ethers.

3. That method of producing the salts of fatty acids which comprises reacting an alcoholate with carbon monoxide in the presence of ethyl-oxide.

4. That method of producing sodium-propionate which comprises reacting sodium-ethylate with carbon monoxide in the presence of ethyl-oxide.

5. The method of producing a lower fatty acid which comprises reacting a higher alcoholate with carbon monoxide in the presence of an ether selected from the group consisting of simple and mixed aliphatic ethers and thereafter reacting the salt produced with an acid to produce the fatty acid.

6. The method of producing valeric acid which comprises reacting sodium-butylate with carbon monoxide in the presence of ether selected from the group consisting of simple and mixed aliphatic ethers.

7. That method of producing a fatty acid which comprises treating an alcoholate with carbon monoxide in the presence of an ether selected from the group consisting of simple and mixed aliphatic ethers while maintaining the reaction products under high pressure and low temperature.

8. That method of producing a fatty acid which comprises treating an alcoholate with carbon monoxide in the presence of an ether selected from the group consisting of simple and mixed lower alkyl ethers while maintaining the reaction products under pressures in the neighborhood of from 1000 to 2000 pounds per square inch and at temperatures from 20 to 60 degrees centigrade.

9. That method of producing a fatty acid which comprises treating an alcoholate with carbon monoxide in the presence of an ether selected from the group consisting of simple and mixed lower alkyl ethers while maintaining the reaction products under pressures in the neighborhood of from 1000 to 2000 pounds per square inch and at temperatures from 20 to 60 degrees centigrade while agitating the reaction products.

10. That method of producing fatty acid which comprises treating an alcoholate with carbon monoxide in the presence of an ether selected from the group consisting of simple and mixed lower alkyl ethers while maintaining the reaction products under high pressure and low temperature while agitating the reaction products.

11. That method of producing fatty acid which comprises treating an alcoholate with carbon monoxide in the presence of an ether selected from the group consisting of simple and mixed lower alkyl ethers while agitating the reaction products.

12. That method of producing sodium-propionate which comprises reacting sodium-ethylate with carbon monoxide in the presence of ethyl-oxide while agitating the reaction products.

13. That method of producing sodium-propionate which comprises reacting sodium-ethylate with carbon monoxide in the presence of ethyl-oxide while maintaining the reaction products under high pressures and low temperature.

14. That method of preparing a lower fatty acid salt which comprises reacting an ethylate with carbon monoxide in the presence of an ether selected from the group consisting of methyl ether, ethyl ether, propyl ether, butyl ether, amyl ether, methyl ethyl ether, iso propyl butyl ether and ethyl propyl ether while maintaining the reaction products under high pressures and low temperature.

15. That method of preparing a lower fatty acid salt which comprises reacting an ethylate with carbon monoxide selected from the group consisting of methyl ether, ethyl ether, propyl ether, butyl ether, amyl ether, methyl ethyl ether, iso propyl butyl ether and ethyl propyl ether.

16. That method of producing sodium-propionate which comprises reacting sodium-ethylate with carbon monoxide selected from the group consisting of methyl ether, ethyl ether, propyl ether, butyl ether, amyl ether, methyl ethyl ether, iso propyl butyl ether and ethyl propyl ether.

17. That method of producing a fatty acid which comprises treating an alcoholate with carbon monoxide in the presence of a simple aliphatic ether while maintaining the reaction products under high pressure and low temperature.

18. That method of producing fatty acid which comprises treating an alcoholate with carbon monoxide in the presence of a simple aliphatic ether while maintaining the reaction products under high pressure and low temperature while agitating the reaction products.

19. That method of preparing a lower fatty acid salt which comprises reacting an ethylate with carbon monoxide in the presence of an ether selected from the group consisting of methyl ether, ethyl ether, propyl ether, butyl ether, amyl ether, methyl ethyl ether, iso propyl butyl ether and ethyl propyl ether diluted by an inert solvent.

20. That method of producing fatty acid which comprises treating an alcoholate with carbon monoxide in the presence of an ether selected from the group consisting of methyl ether, ethyl ether, propyl ether, butyl ether, amyl ether, methyl ethyl ether, iso propyl butyl ether and ethyl propyl ether diluted by an inert solvent while agitating the reaction products.

EDGAR T. OLSON.
ARTHUR W. GOOS.